United States Patent
Wang et al.

(10) Patent No.: US 7,337,622 B2
(45) Date of Patent: Mar. 4, 2008

(54) HUMIDITY-BASED DEFOG CONTROL METHOD FOR A VEHICLE CLIMATE CONTROL SYSTEM

(75) Inventors: Mingyu Wang, E. Amherst, NY (US); Charles A. Archibald, Lockport, NY (US); Karma V. Sangwan, East Amherst, NY (US); Thomas M. Urbank, Lockport, NY (US)

(73) Assignee: Delphi Technologies, Inc., Troy, MI (US)

( * ) Notice: Subject to any disclaimer, the term of this patent is extended or adjusted under 35 U.S.C. 154(b) by 458 days.

(21) Appl. No.: 11/030,517

(22) Filed: Jan. 6, 2005

(65) Prior Publication Data

US 2005/0115255 A1 Jun. 2, 2005

Related U.S. Application Data

(63) Continuation-in-part of application No. 10/678,532, filed on Oct. 3, 2003, now Pat. No. 6,862,893.

(51) Int. Cl.
*F25D 21/00* (2006.01)
*F25B 49/00* (2006.01)

(52) U.S. Cl. ............... 62/150; 62/176.1; 236/44 A; 165/222

(58) Field of Classification Search ............ 62/150, 62/176.1, 176.2, 176.6, 272; 236/44 A, 44 C; 165/222, 223
See application file for complete search history.

(56) References Cited

U.S. PATENT DOCUMENTS

| | | | |
|---|---|---|---|
| 4,920,755 A | 5/1990 | Tadahiro | 62/171 |
| 5,653,904 A | 8/1997 | Adlparvar | 219/203 |
| 5,701,752 A | 12/1997 | Tsunokawa | 62/183 |
| 6,311,505 B1 | 11/2001 | Takano | 62/159 |
| 6,508,408 B2 | 1/2003 | Kelly | 236/91 |
| 6,971,584 B2 * | 12/2005 | Schmitt et al. | 236/44 R |
| 2004/0083748 A1 | 5/2004 | Homan | 62/244 |
| 2006/0225450 A1 * | 10/2006 | Dage et al. | 62/323.1 |

FOREIGN PATENT DOCUMENTS

| | | |
|---|---|---|
| DE | 19942286 | 8/2000 |
| EP | 1356966 A | 10/2003 |
| JP | 58016914 A | 1/1983 |
| JP | 60-248423 | 12/1985 |

OTHER PUBLICATIONS

EP 05 07 7949 European Search Report Dated Sep. 2, 2006.

* cited by examiner

*Primary Examiner*—Marc Norman
(74) *Attorney, Agent, or Firm*—Patrick M. Griffin

(57) ABSTRACT

A vehicle climate control system develops a fog index based on relative humidity at or near the inner surface of the windshield, and uses the fog index to variably override the normal control settings. The relative humidity is combined with a pair of humidity thresholds to form a dimensionless fog index, and fog index values within a predetermined range are applied to a variable path function for transitioning between existing control settings and control settings that maximize defogging.

7 Claims, 4 Drawing Sheets

HUMIDITY-BASED DEFOG CONTROL METHOD FOR A VEHICLE CLIMATE CONTROL SYSTEM

RELATED APPLICATIONS

This application is a continuation-in-part of U.S. patent application Ser. No. 10/678,532, filed on Oct. 3, 2003, now U.S. Pat. No. 6,862,893, and assigned to the assignee of the present invention.

TECHNICAL FIELD

This invention relates to climate control in a motor vehicle, and more particularly to a method of operation for automatically preventing window fogging.

BACKGROUND OF THE INVENTION

In general, vehicle climate control systems include a controller that regulates a number of parameters such as blower motor speed, refrigerant compressor activation and/or capacity, air mixing door position, and discharge temperature. In a manual system, the operator directly or indirectly controls the parameters, while in an automatic system, the parameters are automatically controlled in response to a number of inputs, including cabin air temperature, outside air temperature and solar loading, to regulate the cabin air temperature at a set temperature selected by the operator. In either type of system, front and rear window defogging functions are ordinarily manually activated by the operator when the presence of fogging is noticed.

The desirability of providing automatic activation of front and rear defogging functions has been recognized in the prior art. See, for example, the U.S. Pat. Nos. 4,920,755; 5,653,904; 5,701,752; and 6,311,505, the German Patent No. DE 19942286, and the Japanese Patent No. 60-248423. These are typically on/off systems that override existing control settings when fogging or the potential of fogging is detected. Additionally, the U.S. Pat. No. 6,508,408 to Kelly et al. discloses a technique for calculating a fog factor that quantifies the potential of fogging, and using the fog factor to variably bias the control settings toward values that maximize defogging. However, calculating the fog factor of Kelly et al. requires knowledge of the relative humidity and air temperature near the windshield, as well as the air temperature elsewhere in the passenger compartment, and the cost of sensors for measuring these parameters can make the system too expensive for many production vehicles. Accordingly, what is needed is an accurate and cost-effective way of characterizing windshield fogging potential, and a control method for implementing an automatic defogging control based on the fogging potential.

SUMMARY OF THE INVENTION

The present invention is directed to an improved vehicle climate control system that develops a fog index based on relative humidity at or near the inner surface of a window, and uses the fog index to variably override the existing control settings. In a preferred embodiment, the relative humidity is combined with a pair of humidity thresholds to form a dimensionless fog index, and fog index values within a predefined range are applied to a variable path function for transitioning between existing control settings and maximum defog settings.

DESCRIPTION OF THE PREFERRED EMBODIMENT

Figure 1:
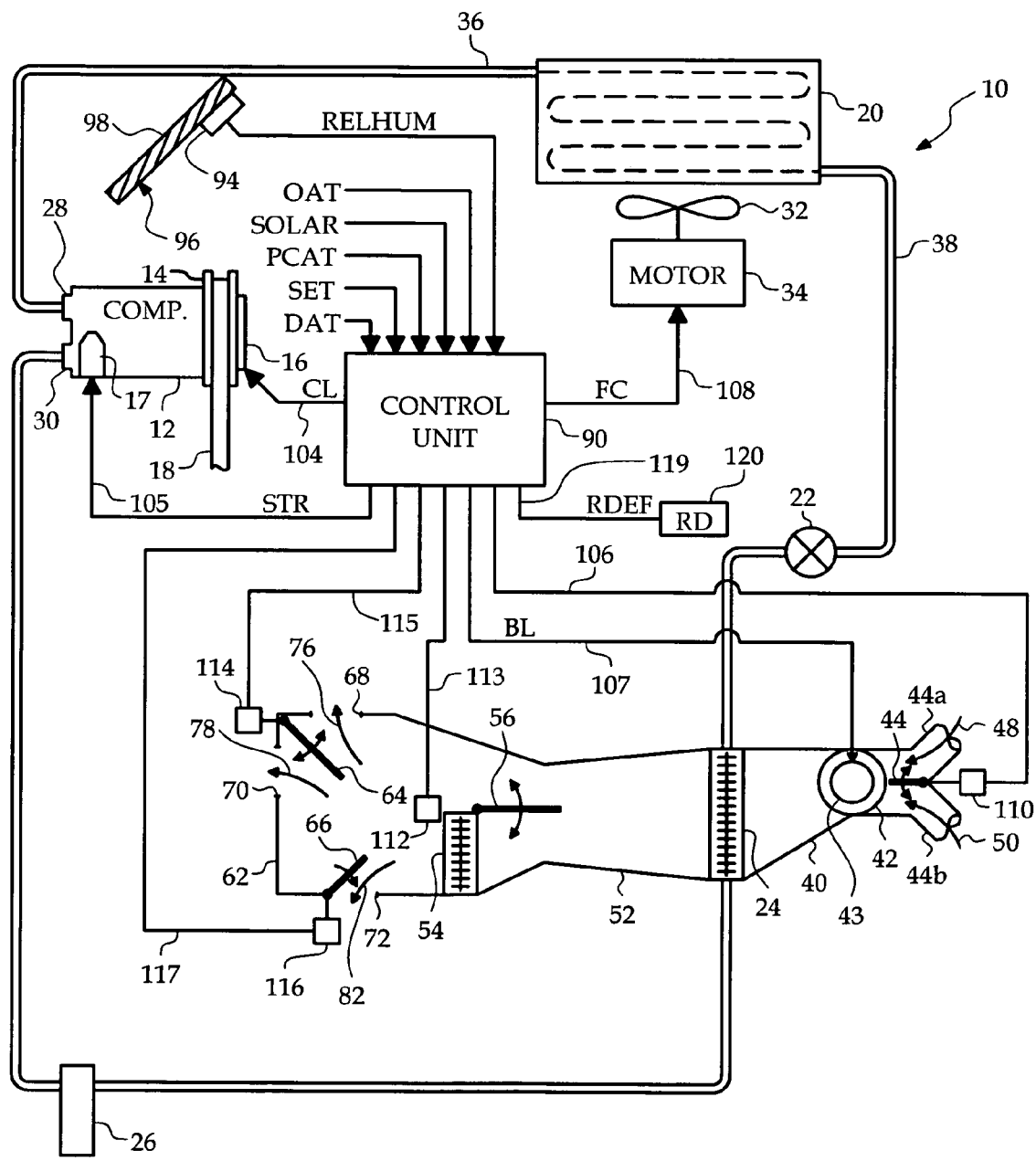
FIG. 1 is a block diagram of a vehicle climate control system according to this invention, including a microprocessor based control unit.

Referring to FIG. 1, the method of this invention is described in the context of an automatic climate control system, generally designated by the reference numeral 10. In the illustrated embodiment, the system 10 includes a variable capacity refrigerant compressor 12 having a stroke control valve 17 that is electrically activated to control the compressor pumping capacity. The compressor input shaft is coupled to a drive pulley 14 via an electrically activated clutch 16, and the drive pulley 14 is coupled to a rotary shaft of the vehicle engine (not shown) via drive belt 18, so that the compressor 12 can be turned on or off by respectively engaging or disengaging the clutch 16. Other compressor arrangements are also possible, such as a fixed displacement compressor that is cycled on and off to control compressor capacity, or a variable displacement compressor that is directly driven by the vehicle engine without a clutch.

The system 10 further includes a condenser 20, an orifice tube 22, an evaporator 24, and an accumulator/dehydrator 26 arranged in order between the compressor discharge port 28 and suction port 30. The electric drive motor 34 of cooling fan 32 is controlled to provide supplemental airflow for removing heat from high pressure refrigerant in condenser 20. The orifice tube 22 allows the cooled high pressure refrigerant in line 38 to expand in isenthalpic fashion before passing through the evaporator 24. The accumulator/dehydrator 26 separates low pressure gaseous and liquid refrigerant, directs gaseous refrigerant to the compressor suction port 30, and stores excess refrigerant that is not in circulation. In an alternative system configuration, the orifice tube 22 is replaced with a thermostatic expansion valve (TXV); in this case, the accumulator/dehydrator 26 is omitted, and a receiver/drier (R/D) is inserted in line 38 upstream of the TXV to ensure that sub-cooled liquid refrigerant is available at the TXV inlet.

The evaporator 24 is formed as an array of finned refrigerant conducting tubes, and an air intake duct 40 disposed on one side of evaporator 24 houses a ventilation blower 42 driven by blower motor 43 for forcing air past the evaporator tubes. The duct 40 is bifurcated upstream of the blower 42, and an inlet air control door 44 is adjustable as shown to control inlet air mixing; depending on the door position, outside air may enter blower 42 through duct leg 44a as indicated by arrow 48, and passenger compartment air may enter blower 42 through duct leg 44b as indicated by arrow 50.

An air outlet duct 52 disposed on the downstream side of blower 42 and evaporator 24 houses a heater core 54 formed as an array of finned tubes through which flows engine coolant. The heater core 54 effectively bifurcates the outlet duct 52, and a re-heat door 56 next to heater core 54 is adjustable as shown to divide the airflow through and around the heater core 54. The heated and un-heated air portions are mixed in a plenum portion 62 downstream of re-heat door 56, and a pair of mode control doors 64, 66 direct the mixed air through one or more outlets, including a defrost outlet 68, a panel outlet 70, and a heater outlet 72. The mode control door 64 is adjustable as shown to switch the outlet air between the defrost and panel outlets 68, 70, as indicated by arrows 76, 78, respectively. The mode control door 66 is adjustable as shown to control airflow through the heater outlet 72, as indicted by arrow 82.

The above-described components of system 10 are controlled by the microprocessor-based control unit 90, which is responsive to the normal automatic climate control inputs such as outside air temperature (OAT), solar loading (SOLAR), passenger compartment air temperature (PCAT), a set temperature (SET) and discharge air temperature (DAT), and a relative humidity input (RELHUM) for determining fogging potential. Other inputs not shown in FIG. 1 include the usual operator demand inputs, such as the override controls for mode, blower motor 43 and rear window defogger grid 120. A relative humidity sensor 94 for generating the RELHUM input is located on an inside surface 96 of windshield 98 as shown.

In response to the inputs mentioned above, the control unit 90 develops output signals for controlling the compressor clutch 16, the capacity control valve 17, the fan motor 34, blower motor 43, and the air control doors 44, 56, 64 and 66. In FIG. 1, the output signals CL, STR, FC and BL for clutch 16, stroke control valve 17, condenser fan motor 34, and blower motor 43 appear on lines 104, 105, 108 and 107, respectively. The air control doors 44, 56, 64, 66 are controlled by corresponding actuators 110, 112, 114, 116 via lines 106, 113, 115 and 117, respectively. Additionally, the control unit 90 generates an output signal RDEF on line 119 for controlling activation of rear window defogger grid 120.

The present invention is directed to a control carried out by the control unit 90 that automatically overrides the default climate control settings (manual or automatic) for the purpose of preventing the formation of fog on the windshield 98 or eliminating fogging as quickly as possible. Since windshield fogging can occur at different times and for a number of different reasons, reliable prevention of fogging requires an accurate and reliable judgment of the fogging potential. Fundamentally, this invention recognizes that the potential for fogging can be reliably indicated simply by quantizing the nearness of RELHUM to 100%, since fogging is deemed to be present when RELHUM equals 100%. Thus, the fogging potential can be defined as the difference (RELHUM−RH_LO), where RH_LO is a relative humidity threshold such as 90%. However, since the distribution of relative humidity near the windshield 98 tends to be non-uniform, the fogging potential is preferably defined in reference to a second relative humidity threshold RH_HI representing an upper control band limit. In this case, the threshold values RH_LO and RH_HI effectively divide the range of fogging potential into three zones: (1) a first zone (RELHUM≦RH_LO) where the air is sufficiently dry that no defogging action is required; (2) a second zone (RELHUM≧RH_HI) where heavy fogging is expected and maximum defogging action is required; and (3) a third zone (RH_LO<RELHUM<RH_HI) of possible fogging between the first and second regions. The first, second and third zones are identified in FIG. 2 as ZONE I, ZONE II and ZONE III, respectively. The thresholds RH_LO and RH_HI thus essentially define a transition band in which the control transitions between default climate control settings and maximum defog settings.

Figure 2:
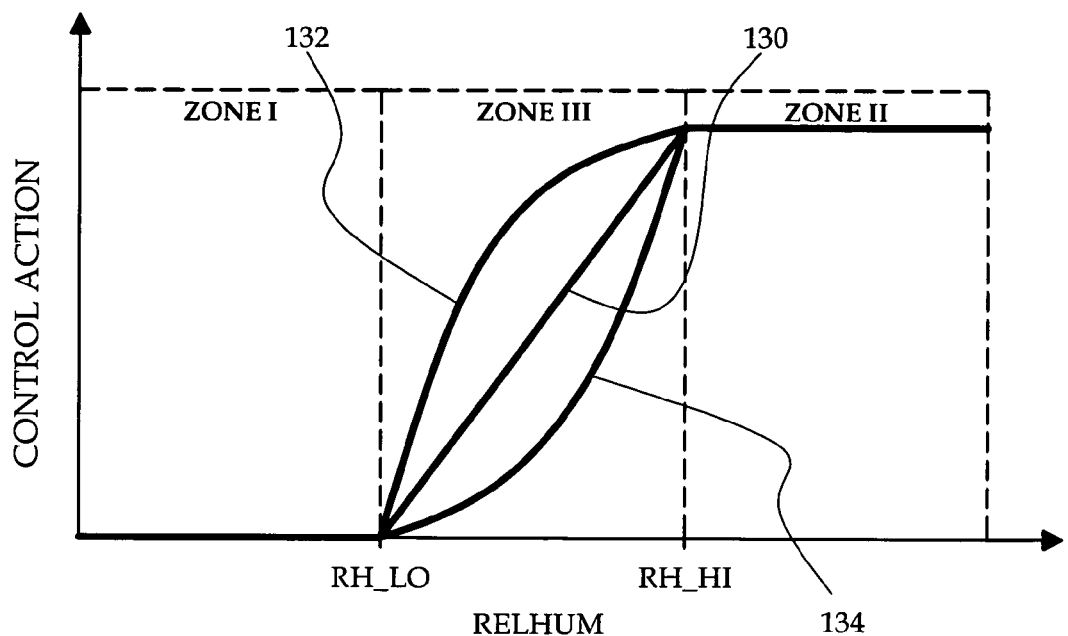
FIG. 2 depicts a three-zone automatic defog control according to this invention.

The trace(s) depicted in FIG. 2 represent the amount or degree of defogging control action to be taken by control unit 90. In Zone I where RELHUM<RH_LO, the defog control is inactive, and the control unit outputs are the default control settings. In Zone II where RELHUM>RH_HI, the maximum control setting override is put into effect, and in Zone III, a partial control setting override is put into effect. The control path function in Zone III may be proportional as indicated by the linear trace 130, or nonlinear as indicated by the traces 132 and 134. The nonlinear control path designated by the trace 132 provides a relatively aggressive defogging response; it can be used to initiate preemptive defogging response in anticipation of fog formation, or can be used to compensate for the slow response of certain relative humidity sensors. On the other hand, the control path designated by the trace 134 provides a subdued response at the early stage of fogging and a steep ramp-up near the upper limit; this response characteristic can be used to optimize passenger comfort at the early stages of fogging while still ensuring sufficient defogging when the fogging risk is more significant.

The thresholds RH_LO and RH_HI are calibrated in a humidity-controlled environmental chamber. If testing shows that the location of relative humidity sensor 94 tends to lag in fog formation, RH_HI should be assigned a value less than 100% (95%, for example) to gain a more aggressive response for the fogging part of windshield 98. On the other hand, RH_HI should be assigned a value greater than 100% (105%, for example) if the location of sensor 94 tends to lead in fog formation. Also, RH_LO and RH_HI can be calibrated to vary as a function of the outside air temperature OAT to provide accurate operation in any season.

In a preferred implementation, the control unit 90 computes a normalized FOG_INDEX as follows:

$$\text{FOG\_INDEX} = (\text{RELHUM} - \text{RH\_LO})/(\text{RH\_HI} - \text{RH\_LO}) \tag{1}$$

In Zone I, FOG_INDEX≦0, in Zone III, 0<FOG_INDEX<1, and in Zone II, FOG_INDEX≧1. The term FOG_INDEX varies linearly with the severity of fogging risk and gives a sense of the fogging severity in understandable terms: 0% (i.e., 0) is no fogging and 100% (i.e., 1) is heavy fogging. The control path calibration for Zone III can be advantageously implemented by defining a fog factor α that is a power function of FOG_INDEX as follows:

$$\alpha = \text{FOG\_INDEX}^n \tag{2}$$

Figure 3:
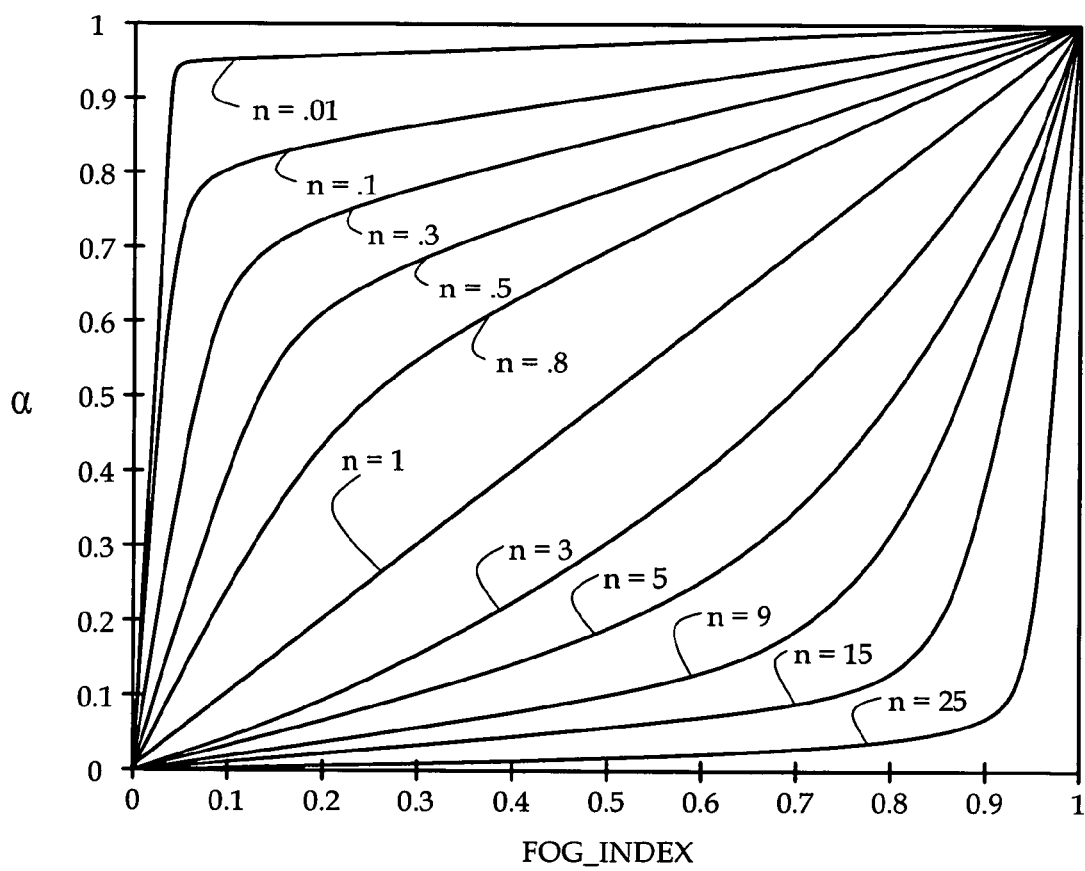
FIG. 3 depicts a variable path control function used in connection with the three-zone defog control of FIG. 2.

The exponent "n" in the power function allows different control paths to be selected as illustrated in FIG. 3. When the exponent n is in the range of zero to one, the corresponding control paths provide relatively aggressive application of defogging control response, as mentioned above in respect to trace 132 of FIG. 2. When the exponent n equals one, a linear or proportional response is realized. And when the exponent n is greater than one, the corresponding control paths provide delayed response characteristics, as mentioned above in respect to trace 134 of FIG. 2.

Figure 4:
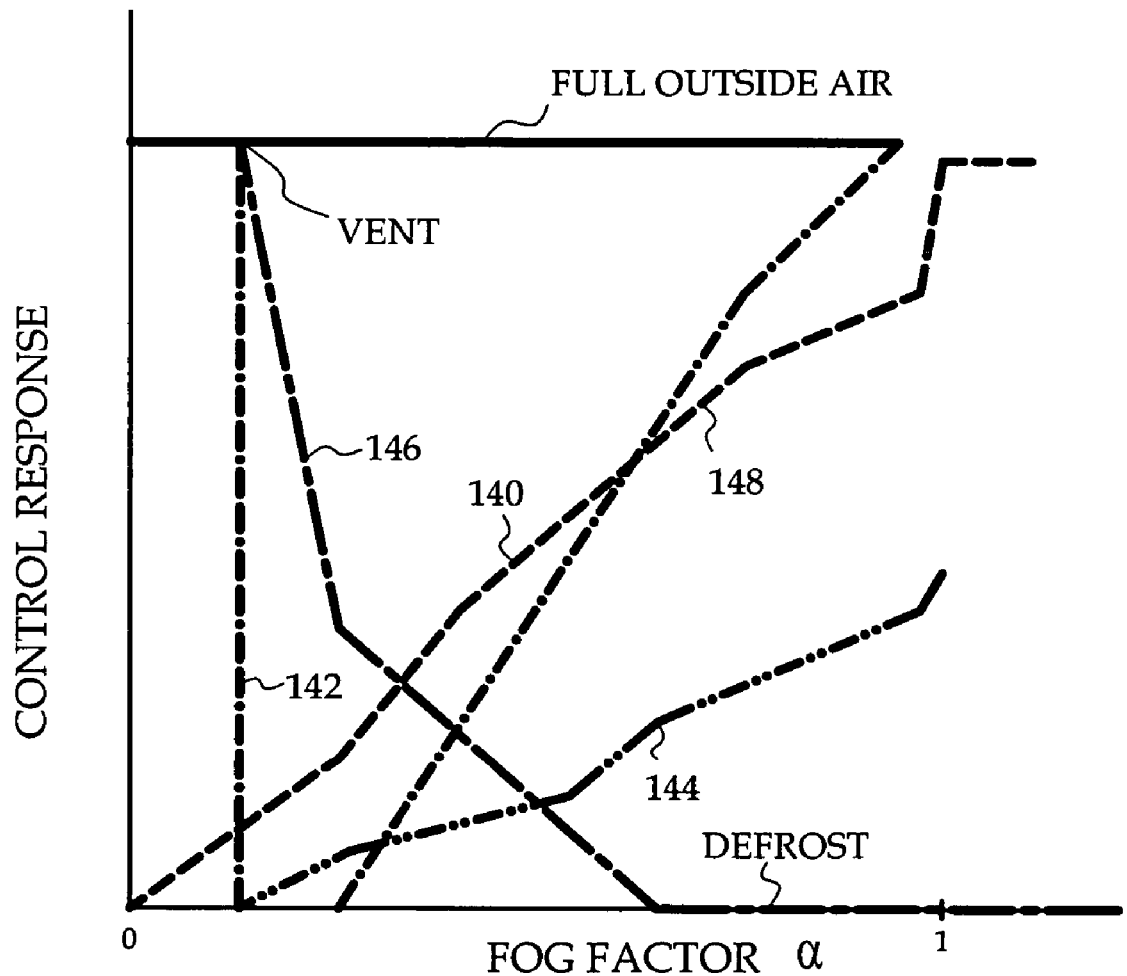
FIG. 4 depicts a climate control override table look-up based on the variable control path function of FIG. 3.

FIG. 4 illustrates possible defogging control responses as a function of the fog factor α for 0<α<1. The trace 140 represents an offset for the commanded discharge air temperature, and illustrates that as the fog factor α increases above zero, the discharge air temperature is immediately increased, while the other control parameters are kept unchanged. The trace 142 represents an offset for the commanded inlet air door position, and shows that when the fog factor a reaches a predefined threshold, the air inlet door 44 is switched to the full outside air position if it is not there already. The trace 144 represents a minimum blower speed, and illustrates how the blower speed is increased with increasing values of fog factor a to ensure sufficient airflow. The trace 146 represents an air delivery mode setpoint, and shows that the air delivery mode of the HVAC system is gradually shifted toward Defrost mode from a pure Vent mode. Finally, the trace 148 represents an offset for the commanded stroke or capacity of compressor 12, and shows that the compressor stroke increases with increasing values of fog factor α. When the fog factor a reaches one, the discharge air temperature will be at full hot, the air inlet door 44 will be set to full outside air, the blower motor 43 will be operating at maximum speed, and the compressor 12 will be at full stroke. Each of these measures is designed to increase the defogging capability of the air stream impinging on the windshield 98. In the outside air mode, fresh air from outside of the vehicle is introduced into the cabin to flush out the humidity accumulated in the vehicle cabin. Turning on the compressor 12 (when ambient temperature permitting) allows the air stream to be dehumidified in the evaporator 24. Heating the outlet air to a higher temperature before discharge reduces the relative humidity level. Higher airflow rate across the windshield 98 during defogging operation increases the heat and mass transfer coefficient, which allows the speedy removal of accumulated moisture.

Figure 5:
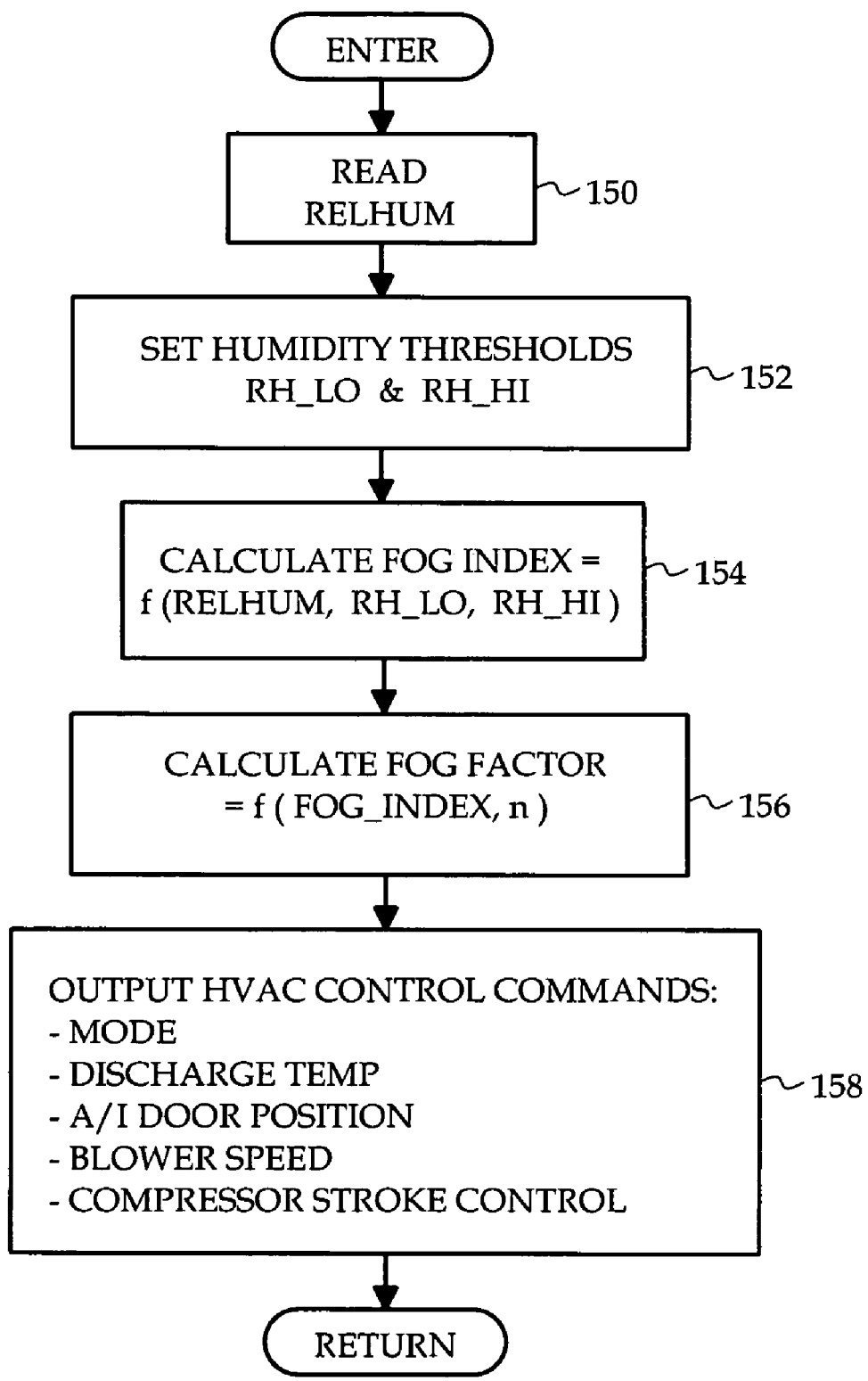
FIG. 5 is a flow diagram representative of a climate control carried out by the control unit of FIG. 1 according to this invention.

FIG. 5 designates a flowchart representative of a software routine executed by the control unit 90 for carrying out the above-described control. The blocks 150 and 152 obtain the input RELHUM and set the thresholds RH_LO and RH_HI. The block 154 calculates FOG_INDEX using equation (1) and block 156 calculates the fog factor α using equation (2). The block 158 then selects defog control responses as a function of fog factor α by table look-up, completing the routine.

In summary, the control of this invention provides a reliable and cost-effective method of variably overriding normal climate control settings to automatically prevent window fogging. The control response region and the aggressiveness of the response can be calibrated to suit the vehicle manufacturer. While this invention has been described in reference to the illustrated embodiment, it is expected that various modifications in addition to those mentioned above will occur to those skilled in the art. For example, the control may be applied to any vehicle window, and in vehicles having very large windshields, it may be desirable to use more than one humidity sensor on the windshield. Also, the control is applicable to so-called manual control systems in which the vehicle operator manually controls compressor activation, fan speed, mode and air inlet functions. Thus, it is intended that the invention not be limited to the disclosed embodiment, but that it have the full scope permitted by the language of the following claims.

The invention claimed is:

1. A method of operation of a climate control system for a vehicle cabin bounded in part by a window, where the climate control system generates control signals for controlling climate control elements to condition air in the cabin, the method of operation comprising the steps of:
   measuring a relative humidity near an interior surface of said window; and
   setting lower and upper relative humidity thresholds to define a first zone characterized by relative humidity below said lower threshold for which the control signals generated by said climate control system are not modified, a second zone characterized by relative humidity above said upper threshold for which the control signals generated by said climate control system are modified to fully increase a defogging effect of said control elements, and a third zone characterized by relative humidity between said lower and upper threshold values for which the control signals generated by said climate control system are modified to partially increase a defogging effect of said control elements.

2. The method of claim 1, including the step of:
   defining a variable control path of climate control signal modification for said third zone.

3. The method of claim 2, wherein said variable control path is defined by a power function that enables calibrator selection of linear and non-linear control paths.

4. The method of claim 1, including the step of:
   computing a fog index in accordance with the expression:

(RELHUM−RH_LO/(RH_HI−RH_LO)

where RELHUM is the measured relative humidity, RH_LO is the lower relative humidity threshold, and RH_HI is the upper relative humidity threshold, said first zone being characterized by values of said fog index less then zero, said second zone being characterized by values of said fog index greater than one, and said third zone being characterized by values of said fog index between zero and one.

5. The method of claim 4, including the step of:
   defining a variable control path of climate control signal modification for said third zone based on a power function of said fog index.

6. The method of claim 5, including the step of:
   setting an exponent of said power function to one to provide a linear control path of climate control signal modification, and to a value other than one to provide a non-linear control path of climate control signal modification.

7. The method of claim 1, where said control elements include a refrigerant compressor and said climate control system generates a signal for activating the refrigerant compressor based on a manual input, the method including the step of:
   generating said signal for activating the refrigerant compressor independent of said manual input to increase said defogging effect.

\* \* \* \* \*